Dec. 31, 1940.    V. VIKHMAN    2,226,677
AUTOMATIC MACHINE TOOL FOR MACHINING PROFILED WORKPIECES
Filed Dec. 28, 1936    4 Sheets-Sheet 1

Inventor,
V. Vikhman
By: Glascock Downing Seebold
Attys.

Dec. 31, 1940.   V. VIKHMAN   2,226,677
AUTOMATIC MACHINE TOOL FOR MACHINING PROFILED WORKPIECES
Filed Dec. 28, 1936   4 Sheets-Sheet 2

Inventor
V. Vikhman
By Glascock Downing & Seebold
Attys.

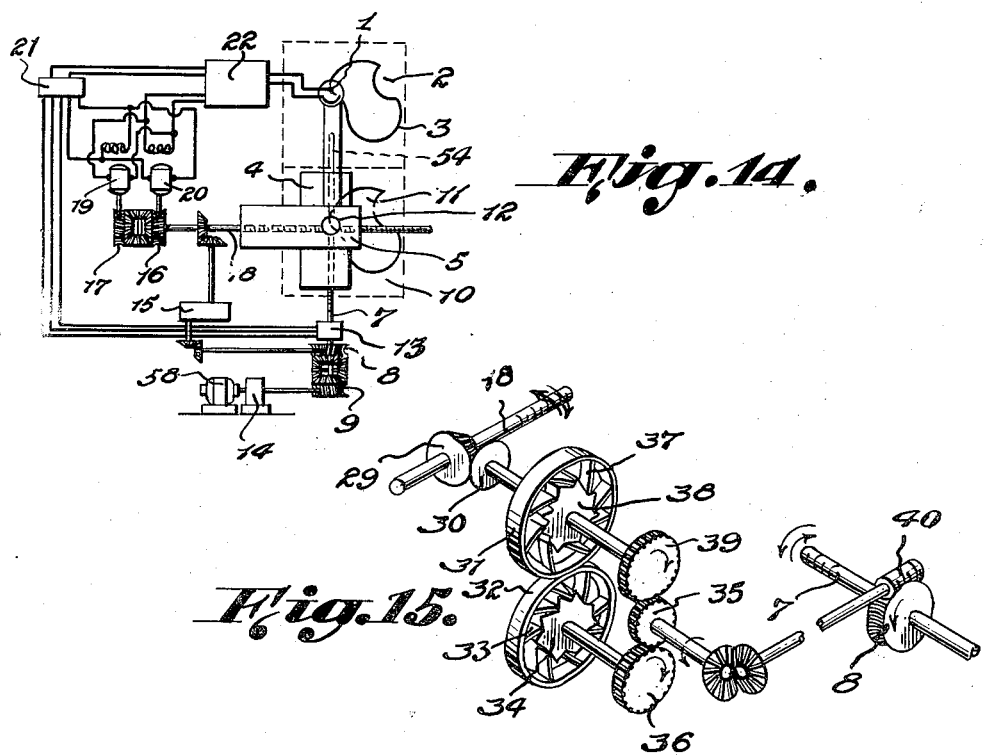
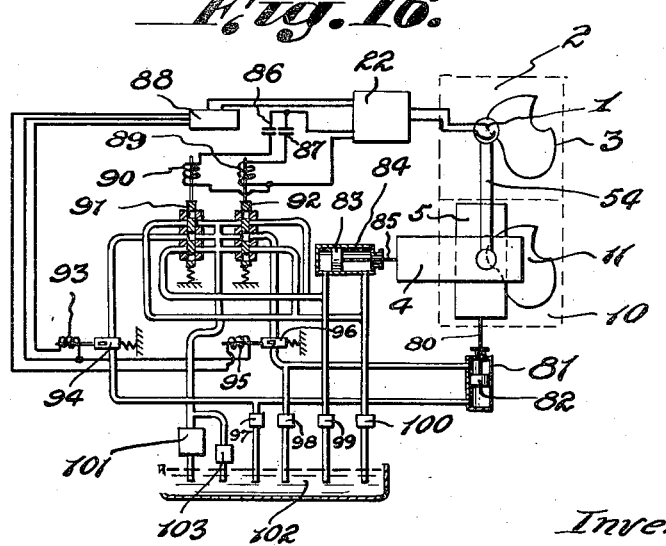

Dec. 31, 1940.   V. VIKHMAN   2,226,677
AUTOMATIC MACHINE TOOL FOR MACHINING PROFILED WORKPIECES
Filed Dec. 28, 1936   4 Sheets-Sheet 4

Inventor,
V. Vikhman
Glascock Downing & Seebold
By:   Attys.

Patented Dec. 31, 1940

2,226,677

UNITED STATES PATENT OFFICE 2,226,677

AUTOMATIC MACHINE TOOL FOR MACHINING PROFILED WORKPIECES

Victor Vikhman, Moscow, Union of Soviet Socialist Republics

Application December 28, 1936, Serial No. 117,950
In the Union of Soviet Socialist Republics March 26, 1936

5 Claims. (Cl. 90—13.5)

The present invention relates to a machine tool for machining profiled articles, more particularly those having a closed outline, in an automatic manner directly from a pattern inserted in the machine, for example, from a drawing produced in black lines on a white field. The machine tools of this type include various turning, milling, planing, slotting and grinding machines and the like.

The hitherto known automatic machine tools for performing this work are based on the mechanical use of copying appliances, curve forming rests, profiled cam disks and the like.

However, automatic machine tools are also known in which the tool reproduces the movements of a device containing a photoelectric cell, which is subjected to the action of rays of light reflected from the drawing or passing through the same.

In all the machine tools of this type, the feed of the slide carrying the tool is substantially divided into two vertical feeding movements, the longitudinal feed and the transverse feed, which follow each other alternately in an outline inclined in the axial direction. The outline of the finished article thus formed shows a fine stepwise shape or form because during the transverse feed, the longitudinal feed ceases and is reversed. Moreover, the working of only unclosed outlines is possible in connection with such known machine tools since none of them provides for a reversal of the longitudinal feed with the consequences resulting from the transverse feed.

In contradistinction thereto, the present invention does not produce a stepwise outline curve but a continuous outline curve since in the automatic machine tool according to the invention, when the outline deviates from the direction parallel to the axis of the work in the machine tool, the resulting transverse feed also causes the change of the longitudinal feed until the complete stoppage of the latter in the direction of the outline perpendicular to the axis. A reversal of the longitudinal feeding movement also takes place even when the direction of the outline is reversed from the vertical to the axial line since the action of the photoelectric device on the transverse feed varies so that the tool can move according to a closed outline which reproduces the closed line of a drawing which is of great importance for milling, slotting and grinding operations and the like.

The essential feature of the present invention consists in constraining a photoelectric device to move along a black line on a white sheet.

Now if this device is connected rigidly or through the medium of a reducing appliance, such as a pantograph, with the lathe saddle or like carriage upon which the lathe tool or other suitable tool is secured, the point of the same will follow, during the working process, the same curve as the photoelectric device and will transmit its action accurately to the workpiece.

The movement along the outline is produced by adding together two movements perpendicular to one another, by means, for example, of two leading screws. The action of the automatic machine tool according to the present invention is diagrammatically illustrated by way of example in the accompanying drawings, in which Figures 1 and 2 show diagrammatically the main device of the new machine tool;

Figure 8:
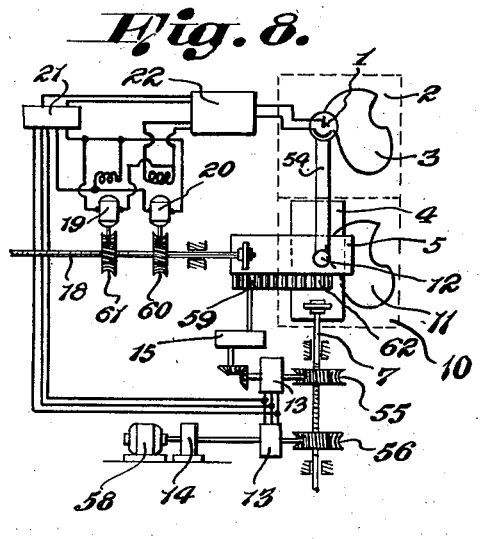
Figure 8 is a diagram illustrating the principle of a machine tool for the production of closed outlines.
Figure 12:
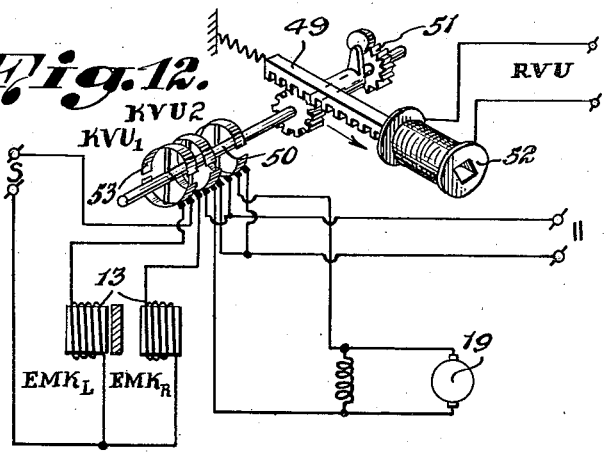
Figure 13:
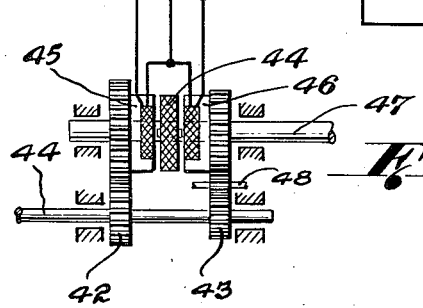

Figure 12 comprises a perspective view of a circuit diagram of an automatic reversing device for the feed;

Figure 13 shows an electro-magnetic clutch;

Figure 14 is a view similar to Fig. 8 showing a modification of the invention.

Figure 17:
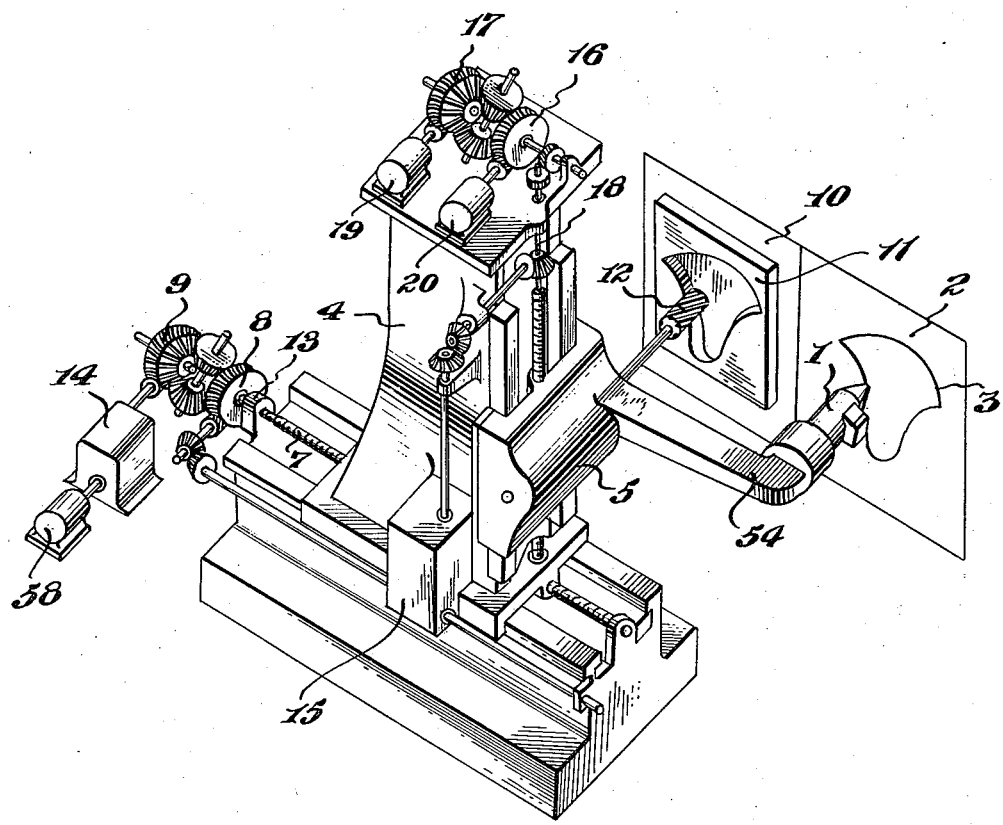

Figure 15 is a perspective view of a rectifying device;

Figure 16 illustrates another form of construction with hydraulic drive for the feeding of the tool, and Figure 17 is a perspective view of the complete machine.

Figure 1:
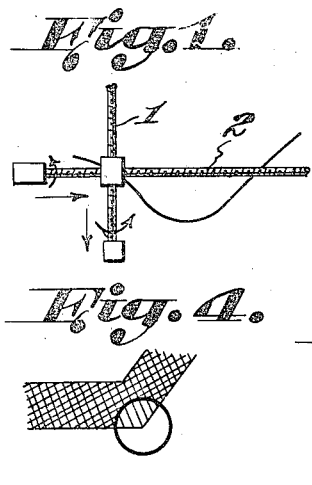

The curve represented in Figure 1 may for example be produced by the continuous rotation of a leading screw 2 in one direction and by the simultaneous alternating rotation of a leading screw 1 in one direction and another. In this case the screw 2 forms the pull to the right, and the screw 1 the transverse pull.

Figure 2:
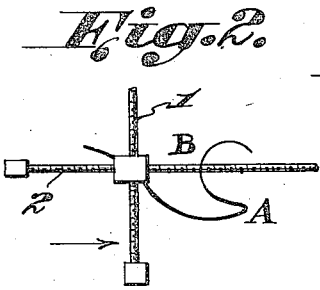

The curved surfaces produced upon profiling milling machines or profiling slotting machines frequently form closed outlines, or profiles which require at times a change in the direction of rotation of the longitudinal leading screw. Such a case is represented in Figure 2. From this figure it is easy to see that along the line A—B the rotation of the leading screw for the longitudinal movement must be reversed in direction. Curved elements of this nature are hereinafter referred to as "reversed lengths," and curves comprising such portions are referred to as "reversing curves." Hence all closed outlines are reversing curves.

The device travelling along the curve of the drawing is referred to in this specification as a photo-electric visor.

Figure 7:
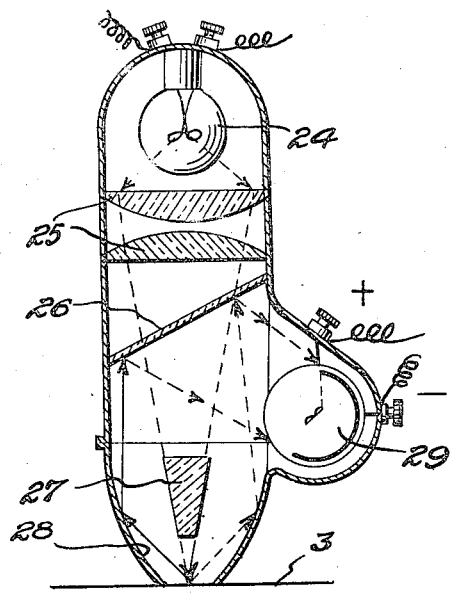
Figure 7 shows diagrammatically in sectional elevation a photo-electric visor, hereinafter more fully described.

This photo-electric visor forms an optical chamber. Figure 7 shows by way of example one embodiment thereof. The main purpose of this device consists in directing upon the margin of the black outline 3 of the drawing a concentrated pencil of rays in such a form as to produce as small a point of light as possible, and then to collect the light reflected from the line and from the white area of the drawing and direct it at the photo-electric cell 29, as shown in Figure 7.

Underneath the source of light 24 is arranged an optical condenser 25, and below the latter is arranged a microscope objective lens 27, which projects on to the drawing a point of light having a diameter of about 0.1 to 0.001 of a millimetre. A parabolic mirror 28, the focus of which corresponds with the position of this point of light, collects the rays reflected from the drawing.

A mirror 26 reflects these rays on to a photo-electric cell. In the centre of this mirror 26 there is an aperture for the passage of the rays of light from the condensing lines 25 to the microscope objective 27.

Figure 3:
Figures 3, 4, 5 and 6 illustrate the action of the drawing upon the photo-electric cell.

The point of light is projected on to the drawing in such a way that normally half of it is on the dark line and the other half on the white area of the drawing, as represented on an enlarged scale in Figure 3.

Figure 4:
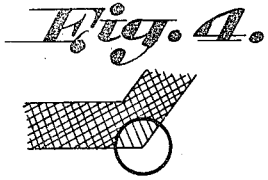
Figure 5:
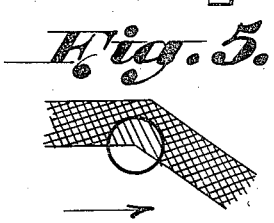

Now if the point of light has a tendency to leave the black line, as would occur for instance in the event of the line tending in a different direction, as shown in Figure 4, the illumination of the photo-electric cell increases, and the current strength in its circuit becomes greater. If on the contrary the point of light begins to move on to the dark line, as represented in Figure 5, the illumination of the photo-electric cell is diminished, and the current strength in its circuit is likewise reduced.

Now the current passing through the photo-electric cell acts upon the grid of a Thyratron or amplifying valve, thereby controlling the anode current.

The photo-electric visor is secured to a combined rest, which consists of a bed slide and a cross or parting slide. The slides receive their feed from the longitudinal and transverse leading screws respectively.

The machine tool is so arranged that the transverse leading screw, which revolves alternately in one direction or the other during the rotation of the longitudinal leading screw, constrains the point of light to move along the outline in the drawing in such a way that it always lies half on the black line and half on the white area. If the point of light begins to leave the black line or begins to cover more of it, the transverse leading screw immediately revolves in one direction or the other and brings the point of light back into its normal position in relation to the black line on the drawing.

The machining of closed outlines (reversed curves) is obtained by an automatic reversal of the direction of rotation of the longitudinal leading screw at the initial and terminal points of the reversed curves.

Figure 6:
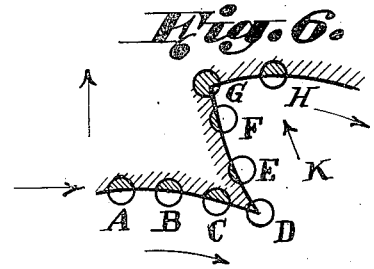

Figure 6 shows a number of successive positions of the point of light at various moments during the machining of a reversed curve. The positions A, B and C correspond to a longitudinal feed towards the right. The point of light is maintained permanently on the margin of the black line, owing to the action of the devices hereinafter described.

At the position D the point of light moves partly out of the region of the line. In consequence of the increase in the illumination of the photo-electric cell the point of light then begins to move rapidly in the direction of the arrow K. Since however a receding length of the curve follows, the illumination of the photo-electric cell is only increased by this movement, for which reason the anode current of the Thyratron greatly increases. In the machine a special relay is provided, which only responds at the moment when the current in the anode circuit in the Thyratron exceeds a predetermined value. The action of this relay causes a change in the direction of rotation of the longitudinal leading screw, and the longitudinal feed then proceeds in the reverse direction.

In this manner there is effected, in the event of an excessive displacement of the point of light from the black line on to the white field, a reversal of the longitudinal feed, and the point of light becomes capable of moving along the curve, and assumes in succession the positions E, F and so forth.

A similar phenomenon also occurs in the event of the point of light being displaced too far on to the black line, as at the position G in Figure 6. In this case the anode current of the Thyratron becomes much too weak. Now in the machine another special relay is provied which only responds if the anode current of the Thyratron falls below a predetermined minimum value. This action of the relay in its turn brings about a reversal of the direction of the longitudinal feed, as a result of which the movement of the point of light along the edge of the black line is re-established.

A device acting on this principle may be embodied in a variety of forms. In the embodiment illustrated in Figure 8, 2 denotes the drawing, on which the profile 3 of the article to be machined is drawn with a black line. 11 denotes the workpiece to be machined, and 12 the tool. The photo-electric visor is secured to a combined rest, consisting of a bed slide 4 and a cross slide 5. The feeding of the cross slide 5 is effected by the axial displacement of the transverse leading screw 18, arising from it being screwed into and out of a nut 61. The screw 18 and the nut 61, formed externally with a worm wheel, revolve in the same direction, and the direction of axial displacement, if any, of the screw 18 depends upon the relationship between the speeds of revolution of the screw 18 and of the worm wheel nut 61. The worm wheel nut 61 is rotated by a continuous current motor 19 and the screw 18 is driven by a continuous current electric motor 20 through the medium of a similar worm wheel 60.

When the two motors 19 and 20 are running at the same speed, there is no axial displacement of the leading screw 18. If, however, the speeds of these two motors are different, the screw 18 moves axially in one direction or the other, according to which of the two speeds is greater.

The current produced in the photo-electric cell controls the speed of revolution of the motors 19 and 20 through the medium of a Thyratron. This control is preferably effected in such a way that with an increase in the speed of revolution of one motor that of the other diminishes, and conversely. This is obtained by passing the anode current of the Thyratron in parallel through the armature of one motor, and through the exciting winding of the other.

In this manner, when the point of light tends to shift off the black line, the speeds of revolution of the feeding motors 19 and 20 are altered in such a way that the leading screw 18 becomes axially displaced, and returns the point of light to its original position in relation to the black line.

If, however, the point of light tends to move further on to the black line, the speeds of the feeding motors are changed in the opposite sense, and the point of light is brought back to its original position again.

The feeding of the bed slide 4 is effected by the longitudinal leading screw 7 in a manner similar to that described with reference to the transverse feed, but with the difference that the leading screw 17 revolves with constant speed imparted to it by the motor 58 through the reducer 14 and the worm wheel 56. A worm wheel nut 55 is driven by a mechanical rectifying device 15, which is connected with the transverse pull in a special manner to be hereinafter described. Thanks to this arrangement an automatic acceleration or retardation or a complete stoppage of the longitudinal feed is rendered possible, according to the steepness of the profile line to be machined.

The steeper the inclination of this line the slower the longitudinal feed and the faster the transverse feed must be. It is in this that the object of the kinematic connection between the longitudinal and transverse pulls consists.

Fig. 8 shows how the toothed rack 62 which is connected to the cross slide 5 drives the pinion 59. This rack drives a pinion 59, which, by the above-mentioned rectifier device 15, sets in rotation the worm wheel nut 55. In this manner the worm wheel nut 55 only revolves when a transverse feed is being effected. Its speed of revolution is directly proportional to the speed of the transverse feed.

The rotation of the nut 55 has a retarding effect upon the axial displacement of the longitudinal leading screw 7, that is to say, a phenomenon occurs here which is similar to that described above with reference to the transverse feed, so far as the screw and the nut revolve in the same direction.

In this way, in the event of an acceleration of the transverse feed, the longitudinal feed is retarded, and conversely.

When machining curved portions, which are perpendicular to the longitudinal displacement, the displacement of the longitudinal leading screw ceases completely, this being because the speeds of revolution of the screw 7 and of the nut 55 are then equal to one another.

Now the object of the rectifier device 15 consists in the fact that the speed of revolution of the worm wheel nut remains constant when the direction of rotation of the transverse feed changes. The description of this is given below.

Figure 9:
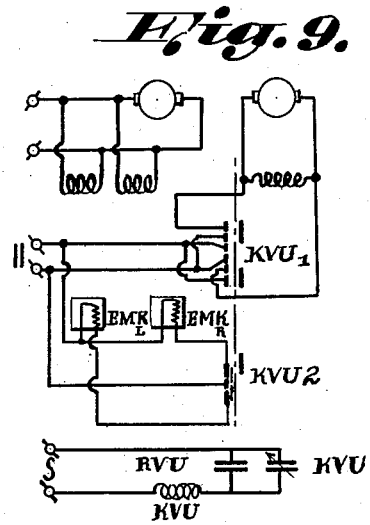
Figure 9 is an electric circuit diagram of the same machine tool.

To effect the above-mentioned reversal of the directions of feed there serves a special electrical switching arrangement, the circuit diagram of which is given in Figure 9. It is to be noted that simultaneously with the reversal of the movement of the longitudinal leading screw there also occurs the reversal of the direction of rotation of the two feeding motors 19, 20, this being because when the point of light moves along the rear portion of the curve, the directions of the transverse feeding movements, in the event of the point of light shifting, have to be oppositely altered.

Figure 10:
Figure 10 is a curve showing how the anode current of the Thyratron depends upon the degree of illumination of the photo-electric cell.
Figure 11:
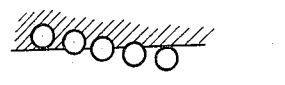
Figure 11 represents the position of the point of light corresponding to the individual points of the curve of Figure 10 in relation to the outline upon the drawing.

In Figure 10 the curve of the anode current of the Thyratrons in relation to the degree of illumination of the photo-electric cell is shown. The characterising ordinates are marked with a straight line. Figure 11 shows the corresponding positions of the points of light in relation to the margin of the black line of the drawing. The outermost ordinate to the left corresponds to the excessive displacement of the point of light on to the black line, as a result of which the reversal of the feeding movements is effected. The outermost ordinate to the right corresponds to the excessive displacement of the point of light away from the black line on to the white area, as a result of which the feeding movements are likewise reversed. The intervening ordinates and positions of the points of light correspond merely to the change in the direction of transverse displacement.

Reference will now be made to the circuit diagram of Figure 9. In the anode circuit of the Thyratron there are connected in parallel with one another the armature of the motor 19 for the feed, and the exciting winding of the second feed motor 20 and the coil 21 of the relay RVU for the reversal of the feeding movements.

So long as the point of light is not too greatly displaced from the line of the drawing, only the regulating of the speeds of revolution of the feeding motors 19 and 20 occurs.

The relay RVU has two pairs of contacts $RVU_{max}$ and $RVU_{min}$.

With an excessive weakening or strengthening of the unit current, the contacts $RVU_{min}$ in the one case or $RVU_{max}$ in the other case are closed. In both cases the anode effecting the feeding movements is switched on.

One of the possible forms of construction of this unit will now be described. At each closure of the contacts $RVU_{max}$ or $RVU_{min}$ the current is passed through the winding of the solenoid of the small controller of the feed-reversing device. Each controller drum $KVU_1$ and $KVU_2$ is then rotated through half a revolution. How this half revolution is effected is shown in Figure 12. Each time the solenoid KVU is switched on it suddenly attracts its core, which is connected with the toothed rack 49, and the rack revolves the controller drum through the medium of the pinion meshing therewith and the ratchet wheel 51 through half a revolution. After the return of the point of light to its relatively normal position, the rack 49 is pulled back by a spring or a weight, without however rotating the drum, owing to the arrangement of the ratchet and pawl.

As will be seen from Figure 9, each revolution of the controller involves a reversal of the direction of the current in the exciting winding of the motor 19 and in the armature winding of the motor 20, thereby reversing the direction of rotation of these feeding motors. At the same time also the electro-magnetic reversing clutches $EMK_L$ and $EMK_R$ are also thrown over, which bring about the reversal of the longitudinal feed, that is to say, after every half revolution of the controller drum, either the electro-magnetic clutch EMK$_L$ or the electro-magnetic clutch EMK$_R$ is switched on, one for movement to the left and the other for movement to the right. The arrangement of the clutches of the machine is shown in Figure 8, where they are marked 13.

At every reversal of current a change in the direction of rotation of the toothed wheels 55 and 56 is effected, as a result of which the direction of the axial displacement of the bed slide 4 is also changed.

Each of the electro-magnetic clutches may be constructed in the manner shown in Figure 13. The shaft 41 revolves continuously in one direction. The toothed wheels 42 and 43 are secured to the shaft 4. The toothed wheel 43 meshes through the medium of an intermediate wheel 48 with a toothed wheel 46. In this manner the toothed wheels 45 and 46 revolve in opposite directions. According to which of the clutches is energized, the armature 44 mounted on the shaft 41 by means of a feather key is attracted by the clutch in question, and causes the shaft 41 to rotate in one direction or the other.

Figure 14 shows a different form of construction of the machine tool, which is distinguished from the one first described by the fact that here the worm wheel nuts and screws are replaced by differential wheel gears. The transverse feeding motors 19 and 20 drive corresponding toothed wheels 17 and 16 of the differential gear in opposite directions. According to which of the motors 19 and 20 has the greater speed of revolution, the planet wheels of the differential gear mounted on the axis of the leading screw 18 revolve in one direction or the other, and impart the corresponding movement to the transverse slide. The longitudinal leading screw 7 forms the axis for the planet wheels of the second differential gear. The toothed wheel 9 receives constant rotation from the motor 58, with its reducing gear 14, and the toothed wheel 8 receives a constant rotation from the transverse leading screw 18, through the rectifier device 15. The electro-magnetic reversing clutch 13 is mounted directly on the shaft of the longitudinal leading screw 7.

The rectifier device 15 is diagrammatically illustrated in Figure 15. The shaft of the transverse leading screw 18 drives, through bevel counter-shaft gearing 30, 30a, a ring of teeth 31, which meshes with a similar ring of teeth 32. On the interval periphery of each of these rings of teeth are provided a number of resilient pawls 33, 37, which bear against the corresponding teeth of the ratchet wheels 38 and 34. The ratchet wheel 38 is connected with the toothed wheel 39, and the ratchet wheel 34 with the toothed wheel 36. It is easy to see that whatever may be the direction of rotation of the shaft 18, the toothed wheel 35 always revolves in the same direction.

The embodiment of the machine tool according to Figure 16 differs from those already described by the employment of hydraulic driving means for the tool instrument.

All essential features of the operation of these constructional forms are the same as in connection with those described above. There will also be obtained the continuous course of the movement of the point of light, the automatic reversal of the feeding movements along the return sections of the outline and the simultaneous action of the transverse and longitudinal feed under the action of the transverse feeding device on the longitudinal feeding device.

The transverse slide 5 is connected to the piston 83 of a hydraulic cylinder 84 by means of the piston rod 85. The bed slide 4 is in its turn connected to the piston 82 of the hydraulic cylinder 81.

The oil serving as working mediums is provided in the tank 102. By means of the pump 101, the oil is supplied to the controlling device which consists of two similarly designed valves 91 and 92. The oil is distributed in six separate channels or passages, three of which belong to the valve 91 and the other three to the valve 92.

Each valve has three openings in accordance with the said three passages or channels. According to the passage to which the opening of one or the other valve is adjusted, the oil passes into the corresponding space of the cylinder 84 or 81.

The valve 91 is operated by the solenoid 90 and the valve 92 is operated by the solenoid 89.

The apparatus operates in the following manner:

For reasons hereinafter explained, the contacts 86 of the contacts 87 are normally closed during the working of the blank or workpiece.

It may be assumed that the contacts 87 are closed and consequently the solenoid 89 is effective and the solenoid 90 is inoperative. The valve 91 closes the passages through which the oil is supplied to the cylinder 84. This is effected for example by automatically connecting to the solenoid 90 an electric current which compensates for the action of the spring which draws back the valve.

The action of the solenoid 89 takes place in the following manner:

If the contacts 87 are closed, the anode current of the Thyratron flows through the solenoid 89, the strength of the current corresponding to the lighting strength or intensity of the photoelectric element.

While the contacts 87 are closed, the valve 96 is open so that the oil can pass into the upper space of the cylinder 81. When the point of light is normally on the outline of the drawing, a current of medium strength flows through the solenoid winding 89 and the valve 92 is maintained in its middle position. The oil is supplied only in the upper space of the cylinder and only the longitudinal feed takes place.

If, however, the point of light has a tendency to move off the black area onto the white area, the current strength in the solenoid 87 increases and the valve 92 is drawn upward. The admission of oil into the right-hand chamber of the cylinder 84 begins and the piston 83, which moves to the left returns the point of light to its normal position while the oil is forced by the throttle device 99 out of the left-hand chamber of the cylinder 84 into the tank 102.

If, however, the point of light has a tendency to move onto the black area, the current in the solenoid 89 will be weakened, the valve 92 will be drawn back by the spring and the admission of oil into the left-hand chamber of the cylinder 84 begins, whereby the point of light is brought back to its normal position.

During the movement of the valve 92 upward or downward from its middle position, the opening through which the oil passes into the upper part of the cylinder is diminished and the longitudinal feed is thereby retarded.

Consequently, in this embodiment, an acceleration of the transverse feed also takes place and the longitudinal feed is retarded until it ceases altogether on the vertical sections of the outline.

On the return sections of the outline, there occurs an excessive displacement of the point of light from the black to the white area or vice versa which gives rise to an automatic reversal of the longitudinal feed and affects the influence of the displacement of the point of light on the transverse feed.

This is effected by means of the relay for reversing the feed in a similar manner to the operation of the relay 21 (Figure 14).

In Figure 16 this relay is designated 88. It may also be designed similarly to Figures 9 and 12 except that the controller drum has the following effect during each revolution.

(a) During the above described operation of the valve 92, the contacts 87 were closed and the contacts 86 were open.

(b) The valve 96 is open. (The solenoid 95 is without current.)

(c) The valve 96 is closed. A current flows through the solenoid 93 for shutting off the oil supply in the lower part of the cylinder 81.

(d) A current is switched onto the solenoid and maintains the valve 91 in a closed position.

When the feed is reversed, the controller drum operates the other valve 91 after making half a revolution.

(a) The contacts 86 are closed and the contacts 87 are open.

(b) The valve 94 is open. (The solenoid 93 is without current.)

(c) The valve 96 is closed. A current flows through the solenoid 95 for shutting off the oil supply in the upper chamber of the cylinder 81.

(d) A current is switched onto the solenoid 95 and maintains the valve 92 in a closed position.

Consequently, after the rotation of the controller drum, the direction of the longitudinal feed will be changed similarly to Fig. 12 and the valve 91 changes the transverse feed. During the increase of the photo-electric current, the oil does not pass into the right-hand part but into the left-hand part of the cylinder 84 and during the weakening of the photo-electric current, the oil passes into the right-hand part of the cylinder 84 and consequently the transverse feed will be effected in the previous opposite direction. Moreover, the operation is the same as in the embodiments previously described.

97, 98, 99 and 100 indicate hydraulic resistances. 103 is a safety by-pass valve. 22 is the Thyratron device.

Having now particularly described and ascertained the nature of my said invention and in what manner the same is to be performed, I declare that what I claim is:

1. In combination, a reflecting surface having a selected outline depicted thereon, a movable implement, means for tracing the outline on said surface and imparting the tracing movement to said implement, said tracing means including movable means for directing a beam of light partly on said reflecting surface and partly on the outline depicted thereon, photo-electric means operatively responsive to the light rays reflected by said reflecting surface, and means controlled by said photoelectric means for imparting movement to said light directing means to cause the latter to trace said outline, said means for imparting movement to said light directing means including longitudinal and transverse feed devices for imparting movement to said light directing means in two directions, the transverse feed device including two driving motors and a feed screw driven by one of said motors, a nut associated with said screw and driven by the other motor, the relative speeds of said motors varying the extent and direction of feed of the feed device.

2. In combination, a reflecting surface having a selected outline depicted thereon, a movable implement, means for tracing the outline on said surface and imparting the tracing movement to said implement, said tracing means including movable means for directing a beam of light partly on said reflecting surface and partly on the outline depicted thereon, photo-electric means operatively responsive to the light rays reflected by said reflecting surface, and means controlled by said photoelectric means for imparting movement to said light directing means to cause the latter to trace said outline, said means for imparting movement to said light directing means including longitudinal and transverse feed devices for imparting movement to said light directing means in two directions, the transverse feed devices including two driving motors and a feed screw driven by one of said motors, a nut associated with said screw and driven by the other motor, the relative speeds of said motors varying the extent and direction of feed of the feed device, the longitudinal feed device including a feed spindle, a motor driving said spindle at a continuous speed, and a nut on said spindle rotated during transverse feed and accelerating, retarding or completely stopping the longitudinal feed.

3. In combination, a reflecting surface having a selected outline depicted thereon, a movable implement, means for tracing the outline on said surface and imparting the tracing movement to said implement, said tracing means including movable means for directing a beam of light partly on said reflecting surface and partly on the outline depicted thereon, photo-electric means operatively responsive to the light rays reflected by said reflecting surface, and means controlled by said photoelectric means for imparting movement to said light directing means to cause the latter to trace said outline, said means for imparting movement to said light directing means including longitudinal and transverse feed devices for imparting movement to said light directing means in two directions, the transverse feed device including two driving motors and a feed screw driven by one of said motors, a nut associated with said screw and driven by the other motor, the relative speeds of said motors varying the extent and direction of feed of the feed device, the longitudinal feed device including a spindle, a motor driving said spindle at a continuous speed, a nut threaded on said spindle, a toothed rack on the transverse feed device, and a unidirectional driving connection between said rack and said nut.

4. In combination, a reflecting surface having a selected outline depicted thereon, a movable implement, means for tracing the outline on said surface and imparting the tracing movement to said implement, said tracing means including movable means for directing a beam of light partly on said reflecting surface and partly on the outline depicted thereon, photo-electric means operatively responsive to the light rays reflected by said reflecting surface, and means controlled by said photoelectric means for imparting movement to said light directing means to cause the latter to trace said outline, said means for imparting movement to said light directing means including transverse and longitudinal feed devices, driving motors for the feed devices and differential gears connecting the motors with the driving device.

5. In combination, a reflecting surface having a selected outline depicted thereon, a movable implement, means for tracing the outline on said surface and imparting the tracing movement to said implement, said tracing means including movable means for directing a beam of light partly on said reflecting surface and partly on the outline depicted thereon, photo-electric means operatively responsive to the light rays reflected by said reflecting surface, and means controlled by said photoelectric means for imparting movement to said light directing means to cause the latter to trace said outline, the means for imparting movement to said light directing means including longitudinal and transverse feed devices, and hydraulic driving means for said feed devices.

VICTOR VIKHMAN.